United States Patent [19]

Kumhyr

[11] 4,118,603

[45] Oct. 3, 1978

[54] DC SIGNALING CIRCUIT FOR USE IN CONJUNCTION WITH ISOLATION TRANSFORMERS

[75] Inventor: Elmer B. Kumhyr, Raleigh, N.C.

[73] Assignee: Noramco, Inc., Raleigh, N.C.

[21] Appl. No.: 801,733

[22] Filed: May 31, 1977

[51] Int. Cl.² .................. H04M 3/18; H04M 1/18
[52] U.S. Cl. .................. 179/16 E; 179/16 A; 179/78 A
[58] Field of Search ........... 179/16 A, 16 AA, 16 E, 179/16 EA, 16 F, 78 R, 78 A, 2.5 R, 1 C, 2 C, 81 R, 170 R; 323/48, 50; 361/56; 178/64

[56] References Cited

U.S. PATENT DOCUMENTS

| 2,938,955 | 5/1960 | Molnar | 179/16 E |
| 3,166,642 | 1/1965 | Abbott | 179/16 E |
| 3,538,260 | 11/1970 | Brouwer | 179/16 E |
| 3,723,662 | 3/1973 | Macrander | 179/16 F |
| 3,746,795 | 7/1973 | Fitzsimons et al. | 179/16 F |
| 3,798,379 | 3/1974 | Brooks | 179/16 E |
| 3,932,804 | 1/1976 | Allen | 323/48 |
| 3,968,408 | 7/1976 | Allen | 323/48 |

OTHER PUBLICATIONS

Straw & Tilford, "System 731 – Telephone System for Mines", Plessey Systems Technology, Nov. 1977, No. 27, pp. 35–40.

*Primary Examiner*—Kathleen H. Claffy
*Assistant Examiner*—Randall P. Myers
*Attorney, Agent, or Firm*—Mills & Coats

[57] ABSTRACT

The present invention relates to a DC signaling circuit operatively associated with a communication system having an isolation transformer interconnected between a central communication exchange center and a station site such as a power substation or generating plant where high voltage potential exists. The isolation transformer provides protection from fault conditions that could apply hazardous voltage to a cable pair entering the station. Because of the presence of the isolation transformer, there is no direct path for DC signal functions to pass from the station to the central communication exchange center. Thus, the DC signaling circuit of the present invention is designed to simulate and transfer the simulated DC signals across the isolation transformer to a line side of the communication system leading to the central communication exchange center. DC signals and logic information generated by a signal source such as a telephone on the station side of the isolation transformer can thusly be effectively transferred across the isolation transformer exactly as generated and in a clear and undistorted manner due, at least in part, to provisions in the DC circuit that shunt the windings of the isolation transformer during time intervals when DC signals are generated and communicated to the line side of said communication system.

12 Claims, 2 Drawing Figures

DC SIGNALING CIRCUIT FOR USE IN CONJUNCTION WITH ISOLATION TRANSFORMERS

The present invention relates to a communication system and DC signaling circuit therefor, and more particularly to a DC signaling circuit for a communication system of the type having a high voltage isolation transformer interconnected therein wherein the DC signaling circuit is operative to simulate or transfer DC signals from a signaling source across the isolation transformer to a line side of the communication system that leads to a central communication exchange center.

BACKGROUND OF THE INVENTION

In the past it has been common practice to provide high voltage protection with communication cables or lines entering a power substation or generating plant in order to provide protection to personnel and equipment from ground potential rise and other hazardous high voltage fault conditions. Such protection has been necessary because the potential difference that can exist between two remote grounding systems can be very great during fault conditions, and this can lead to high voltages and currents being present and conducted on communication cables or lines connected to the station telephone, telephones, or other communication equipment during fault conditions.

Heretobefore such high voltage protection has been provided by interconnecting a neutralizing transformer between the station equipment and the line side of the communications system leading to a central communication or telephone exchange center. The neutralizing transformer is quite functional in such situations because the metallic path between the station side and line side is unbroken and DC signals and supervisory functions can conveniently be communicated between the station equipment and the central communications or telephone exchange center. Thus, because telephone communication systems employ DC signals such as DC dial pulse signals and "off-hook" DC signals, neutralizing transformers are widely used in telephone communication systems leading to power substations and generating plants and other sites where there is a real possibility of hazardous voltages being conducted on the cables or wires of the communication system leading to the station equipment or to the telephones connected on the station side.

While neutralizing transformers are functionally desirable because of their capability to communicate DC signals across the voltage protection barrier created thereby, the neutralizing transformer does have disadvantages and draw backs. In this regard, the neutralizing transformer is very expensive and quite heavy and bulky in design that makes its application and installation awkward and inconvenient. In addition, the nature of the design of the neutralizing transformer gives rise to a much greater risk of failure because the neutralizing transformer is completely dependent upon a good and positive remote ground that must be located a substantial distance from the station ground matt. If the neutralizing transformer is not properly and adequately grounded, then the high voltage protection supposedly afforded thereby would fail during a fault condition. Moreover, the windings of the neutralizing transformer must be properly connected by polarity to effectively neutralize a high voltage potential since the fault current is directed into a separate winding to neutralize the fault current flow in the line windings. Thus, there is the risk of improper installation and connection and even the presence of the remote ground being corroded or otherwise developing a high resistance to current flow, or even the possibility that the remote ground might be connected to the station grounding. In all of the above cases, the neutralizing transformer would be ineffective to protect against a high potential rise or other hazardous voltage caused by a fault condition. It should be noted that most likely such conditions would go undetected until there is in fact a fault condition realized.

Isolation transformers have been interposed in such communications systems to provide a high voltage barrier within the communication system. Isolation transformers, as compared to neutralizing transformers, are less expensive, smaller, generally more reliable, easy to use and do not have the inherent problems discussed above that are associated with the neutralizing transformer. However, the nature of the isolation transformer results in the metallic path being broken between the windings of the transformer. While this is desirable from a safety consideration, it does present a problem insofar as transferring or communicating DC signals across the isolation transformer. In the past, various means such as high voltage reed relays and opto-electronic couplers have been employed to effectively transfer or simulate DC signals across an isolation transformer. However, such approaches have not been completely satisfactory and very successful as the transfer of simulated DC signals are often inaccurate, are not in exact time sequence with the source signal, or often distorted by the effect of the windings of the isolation transformer, and generally lack the precise control necessary to provide an effective and efficient DC signaling circuit for transferring DC signals and supervisory functions across such an isolation transformer. With isolation transformers, the inductance of the windings of the isolation transformer gives rise to a substantial amount of distortion in the communication system. This distortion when coupled with the natural distortion of the metallic communicating lines of the system seriously interferes with the logic content of any DC signals being communicated such as DC dial pulses from a telephone located on the station side of the isolation transformer. This distortion obviously leads to an ineffective communication system.

SUMMARY OF THE INVENTION

The present invention presents a DC signaling circuit for telephone, telemetry and data communication systems for effectively and accurately transferring DC signals and supervisory functions generated by a signal source across an isolation transformer barrier to a line side wherein the DC signals received about the line side are accurate, in time with the source signal, and are clear and undistorted. In particular, the DC signaling circuit of the present invention is provided with magnetic or opto-electronic couplings that are actuated by the DC signaling circuit in response to certain DC signals or other supervisory functions being generated by a signal source connected about a station side of said isolation transformer and which act to by-pass the isolation transformer and to provide an accurate DC coupling with the line side of the particular communication system involved. Of particular importance is the provisions in the DC signaling circuit that shunt the windings of the isolation transformer in response to certain DC signals, especially DC dial pulse logic, generated by the signal source such that as such DC dial pulses are communicated across the isolation transformer to the line side of the communication system, the windings of the isolation transformer are shunted and the inductances associated with the isolation transformer is effectively removed. This removes distortion from the communication system that results from the inductance from the isolation transformer windings and consequently the DC signals are allowed to be communicated without interference and disturbance from this distortion. Also, a capacitor and transistor network within the DC signaling circuit is particularly provided to assure that during a series of DC dial pulses that comprise a particular dialed digit in the case of a telephone communication system, that the windings of the isolation transformer are shunted for the entire time interval of the dial pulse train comprising the dial digit. With the DC signaling circuit of the present invention, isolation transformers can be universally applied to all communication systems and circuits requiring a high voltage protection barrier. The DC signaling circuit disclosed herein is applicable to all known forms of voice frequency communication circuits employing signaling, supervisory and DC logic functions whether these functions are purely DC pulses, AC tones or a combination of both. It should be noted that the DC signaling circuit of the present invention also provides for built-in conversion of DC signaling functions from one form to another such as loop dial signaling and telephone applications to E and M signaling used in carrier and multiplex channel applications.

It is, therefore, an object of the present invention to provide a DC signaling circuit compatible with a communication system employing an isolation transformer as a high voltage protection barrier wherein said DC signaling circuit is operative to sense DC signals and supervisory functions generated about a station side of said isolation transformer and to effectively transfer the exact sensed signals across said isolation transformer to a line side of said communication system leading to a central exchange office or station.

Another object of the present invention is to provide a DC signaling circuit for a telecommunication system including an isolation transformer interconnected between a station telephone and a central telephone exchange wherein said isolation transformer provides a high voltage protection barrier therebetween, and wherein said DC signaling circuit is operative to sense DC signals and supervisory functions originating from said station telephone such as dial pulses and an "off-hook" signal and to simulate and communicate the exact DC signal sensed to the line side of said isolation transformer, such that at any time DC signals communicated on the line side of said isolation transformer to said central telephone exchange corresponds exactly with signals generated by said telephone.

Still a further object of the present invention is to provide a DC signaling circuit of the basic character described above wherein the signaling circuit includes provisions for shunting the windings of said isolation transformer during time intervals when certain DC signals such as DC dial pulse logic is being generated by a telephone and being simulated and communicated to the line side of said particular communication system, whereby distortion due to the inductance of the windings is avoided and the complete DC pulse logic is transmitted without distortion from the windings of the isolation transformer.

It is also an object of the present invention to provide a DC signaling circuit of the basic character described above wherein the DC signaling circuit is provided with means to assure that the windings of said isolation transformer are shunted during the entire duration of a dial pulse train making up a single dialed digit despite the interruptions between successive dial pulses of the dial pulse train.

Another object of the present invention resides in the provision of a DC signaling circuit of the basic character set forth above for effectively transferring DC signals and supervisory functions across an isolation transformer of a communication system by simulating DC source signals about a line side of the communication system opposite the signal source, and wherein the DC signaling circuit is particularly adapted to minimize distortion so that the logic content of the DC signal can be communicated clearly and exactly and in precise time sequence with the source signal.

Yet another object of the present invention resides in the provision of a universal DC signaling circuit that is adapted for utilization within all known forms of voice frequency communication circuits employing signaling, supervisory and DC logic functions wherein the DC signaling circuit can be universally applied where isolation transformers are utilized as a high voltage protection barrier to effectively cause DC signals generated about one side of the isolation transformer to be communicated and be present on the other side of said isolation transformer.

Other objects and advantages of the present invention will become apparent from a study of the following description and the accompanying drawings which are merely illustrative of the present invention.

DESCRIPTION OF PREFERRED EMBODIMENT

Figure 1:
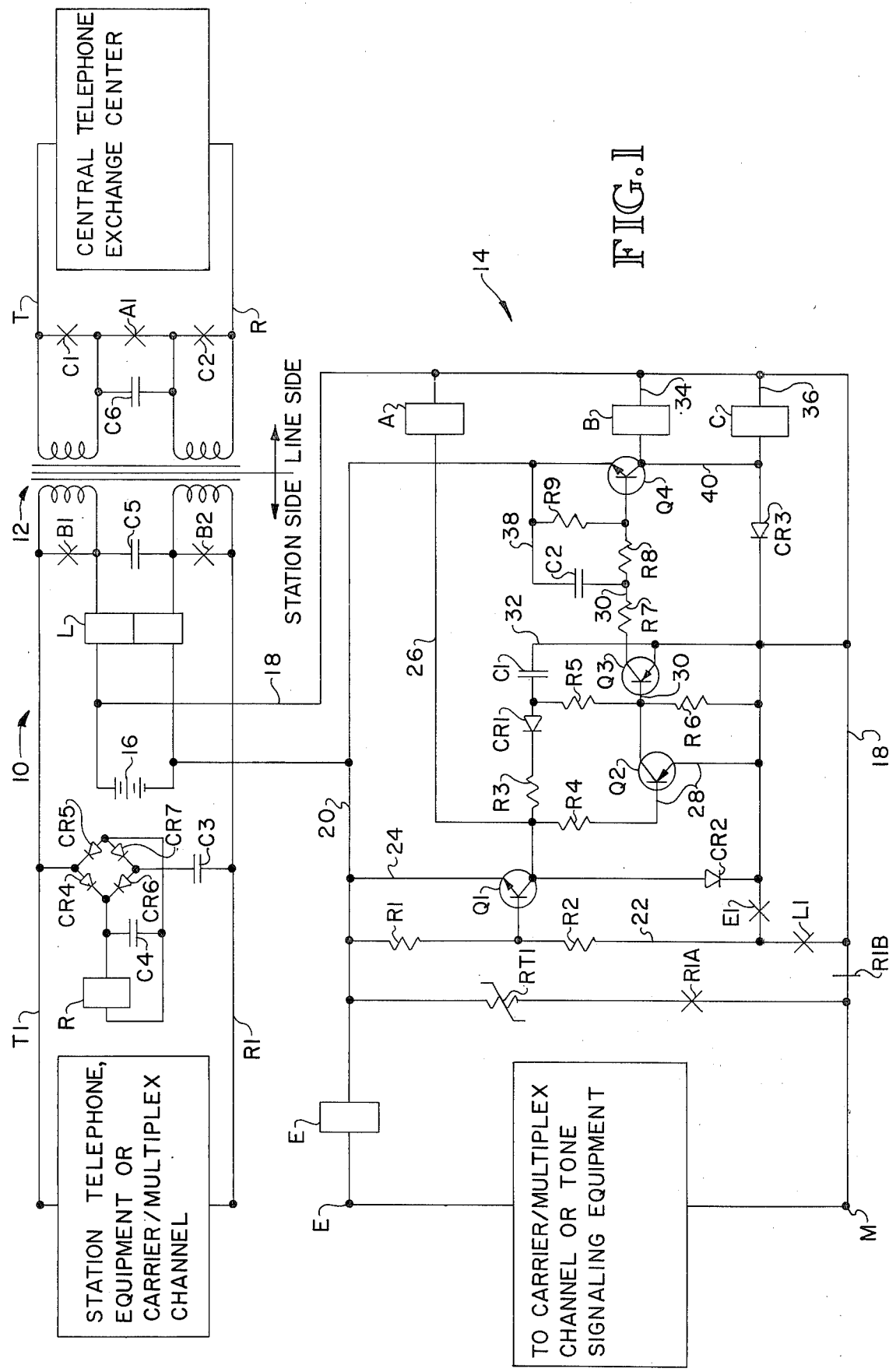
FIG. 1 is an electrical schematic illustrating the DC signaling circuit of the present invention in conjunction with a telephone communication system employing an isolation transformer as a high voltage protection barrier between a station telephone and a communication cable pair leading to a central telephone exchange.

With reference to the drawings, particularly the schematic shown in FIG. 1, a telephone communication system is schematically illustrated therein and indicated generally by the numeral 10. Telephone communication system 10 includes a high voltage protection barrier which is provided by an isolation transformer indicated generally by the numeral 12. Extending from isolation transformer 12 about a station side thereof is a cable pair T1 and R1 leading to a conventional rotary dial telephone, or to other types of telecommunication equipment such as a carrier/multiplex channel.

Connected to isolation transformer 12 about a line side thereof is a line or cable pair T and R which extends to and is communicatively connected in the case of a telephone communication system to a central telephone exchange center.

The presence of the isolation transformer 12 between the station telephone and the central telephone exchange center provides a high voltage protection barrier between the station telephone and cable pair T and R extending on the line side of the isolation transformer. As has already been discussed, the provision of the isolation transformer 12 in a communication system of the type disclosed herein is particularly suited for a situation where a cable pair for a telephone communication system leads to a power substation or generating plant to provide protection to personnel and station equipment from ground potential rise and other hazardous high voltage fault conditions. Where such a fault condition causes a high voltage to be applied to the station side, the isolation transformer 12 will prohibit the current and high voltage from being transferred to the line side of the telephone communication system 10.

The presence of the isolation transformer 12 between the station and line sides of the communication system 10 prohibits DC signals from being transferred directly from the station telephone or station side to the line side of the communication system. In the case of a conventional telephone communication system it is customary for certain signals and supervisory functions to be communicated from the telephone to the central telephone exchange center via DC signals. For example, an "off-hook" condition of the phone is communicated to the central telephone exchange center by DC signal which results in an AC dial tone being communicated back from the central telephone exchange center to the station telephone. In addition, in the case of a rotary dial telephone, the dial pulses generated by the telephone are of a DC nature and consequently must be directed to the central telephone exchange center in order for the dialing party to reach the intended party.

The present invention presents a DC signaling circuit, indicated generally by the numeral 14, which is adapted to sense various DC signals generated by the station telephone or other DC signal source about the station side of the communication system 10, and to effectively transfer or simulate an exact corresponding DC signal to the line side of the communication system 10 where the DC signal can be communicated to the central telephone exchange center or other receiving unit. Referring to the DC signaling circuit 14 in detail, it is seen that the same includes a station battery supply 16 (such as a 24 volt DC power supply) that is connected to the station side of the windings of the isolation transformer 12. Interconnected between the station side windings and the power supply 16 is a relay L that is responsive to a DC source signal being generated by the station telephone or other signaling device and wherein relay L is actuated thereby. Leading from the power supply 16 is a pair of lines 18 and 20 and wherein a first relay contact L1 is provided in line 22 that interconnects lines 18 and 20. Relay contact L1 is actuated or closed by the actuation of relay L due to a DC signal being generated by a signal source (such as a telephone), and the closing of contact L1 drops the bias voltage at the base of transistor Q1 in line 24 due to the voltage drop across resistors R1 and R2 in line 22. This will result in transistor Q1 being switched to an "on" or conducting state and current will thusly flow through transistors Q1, through line 26 and to relay A. This results in relay A being actuated and such results in relay contact A1 connected to the winding on the line side of the isolation transformer to be closed and consequently to complete the circuit between lines T and R through the line windings of transformer 12 and the central telephone exchange center. It should be noted that transistor Q1 when such is conducting also changes the bias of transistor Q2 in line 28 through resistor R4 to a voltage sufficient to switch on transistor Q2. Once transistor Q2 begins to conduct the same maintains a ground potential on the base of transistor Q3 in line 30 sufficient to insure that transistor Q3 does not switch on during any time that transistor Q1 is conducting.

While transistor Q1 is conducting, it is seen that this transistor will charge capacitor C1 connected in line 32 through resistor R3 and diode CR1. It will be appreciated from subsequent portions of this disclosure that the charge on capacitor C1 will serve as a timing function to maintain transistor Q3 in a conductive mode while transistor Q2 is switched off or is not conducting.

Line 30 also includes a fourth transistor Q4 and connected between transistors Q3 and Q4 are a pair of resistors R7 and R8. Transistor Q4 is operatively connected to relays B and C connected in lines 34 and 36, respectively. The actuation of relay B is operative to close relay contacts B1 and B2 that are connected on the station side of the windings of the isolation transformer 12. Actuation of relay C results in contacts C1 and C2 closing on the line side of the isolation transformer 12. It is appreciated that the closing of relay contacts B1, B2, C1 and C2 results in the windings of the isolation transformer 12 being shunted which effectively removes the inductance from these windings and consequently eliminates the distortion caused by the inductance in these windings from the communication system 10.

A second capacitor C2 is connected in line 38 that is connected between lines 30 and 40. Capacitor C2 is charged when transistor Q3 is conducting. Once transistor Q3 is switched off and does not conduct, then capacitor C2 will discharge for a certain time period and during this discharge, transistor Q4 will be actuated and consequently relays B and C will be actuated.

The following discussion will deal with the operation of the DC signaling circuit 14 as the same relates to telephone communication system 10. In an idle or on hook condition, there is an open circuit between lines T1 and R1 and the DC signaling circuit 14 remains idle due to a voltage bias applied through resistors R1 and R9 via lines 20 and 38 to the base of transistors Q1 and Q4 such that these transistors are maintained in an off or nonconducting state. It is noted that transistors Q2 and Q3 are biased to the off state due to ground applied to their base through resistors R4 and R6 via lines 18 and 26.

In the case of an outgoing call, when the telephone receiver is removed from the hook, an "off-hook" condition is created and a low resistance path is created by the telephone between lines T1 and R1 and this results in a current flow from the station battery supply 16 through relay L. It is noted that relay L also serves the function of a battery feeding bridge to supply power to the station telephone instrument. Current flow through relay L causes the relay to be actuated and consequently relay contact L1 is closed, resulting in the bias voltage at the base of transistor Q1 to drop due to the voltage drop across resistors R1 and R2 in lines 20 and 22. This causes transistor Q1 to conduct and consequently current is directed therethrough through line 26 to relay A. This actuates relay A which in turn closes relay contact A1 on the line side of the isolation transformer windings. This consequently yields the same condition with respect to the central telephone exchange center that would exist if there was a direct metallic line connection between the station telephone and the central telephone exchange center. While relay A is actuated, the conducting of transistor Q1 changes the bias of transistor Q2 in line 28 through resistor R4 to a voltage sufficient to switch on transistor Q2. Once transistor Q2 is conducting, this maintains a ground potential on the base of transistor Q3 in line 30 sufficient to assure that it does not switch on during the time in which Q1 is conducting. Also, it should be noted that once Q1 is conducting, it will charge capacitor C1 in line 32 through resistor R3 and diode CR1.

Again, it is observed that relay A through its contact A1 closes a DC path through the line windings of the isolation transformer 12 towards the telephone exchange center. This translates the "off-hook" condition of the telephone instrument to the central telephone exchange. The communication of the "off-hook" condition will seize the central office exchange line circuit and return a dial tone from the central telephone exchange to appraise the user of the telephone of the readiness to receive dial pulsing. It is observed that the dial tone is applied to lines T and R and because such is a purely AC signal, the dial tone passes directly through the isolation transformer 12 to the telephone connected to line T1 and R1 and consequently the dial tone will be heard by the individual using the telephone instrument.

Figure 2:
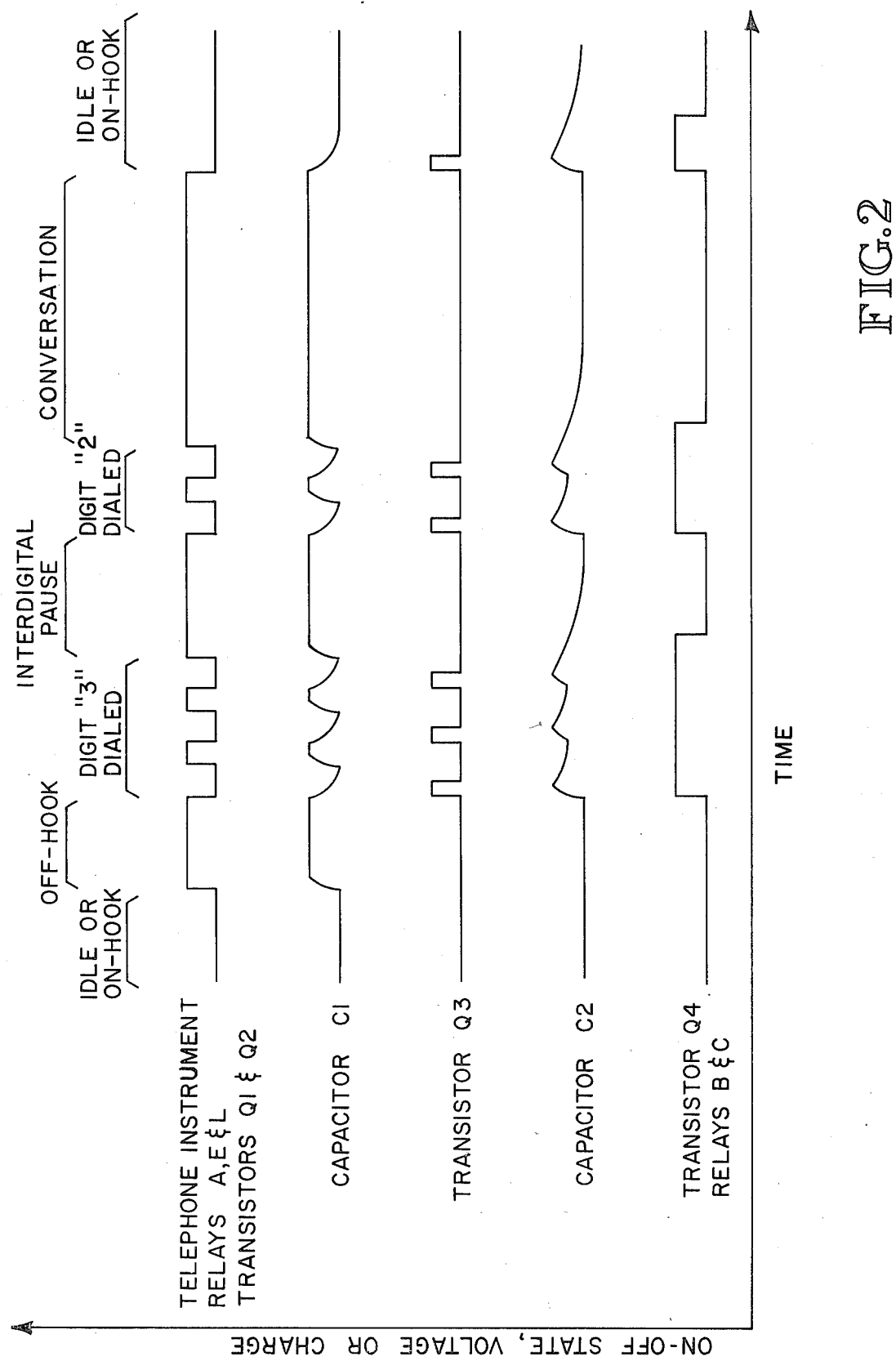
FIG. 2 is a logic time sequence chart including the off-on state, voltage, or charge of various components of the DC signaling circuit for certain telephone use occurrences that may occur in utilizing a telephone at a station protected from high voltage by an isolation transformer in accordance with the present invention.

In viewing FIG. 2, it is noted that in the "off-hook" condition that capacitor C1 and relays A, E, L and transistors Q1 and Q2 are actuated. At this point, the DC signaling circuit 14 of the present invention and the telephone exchange center is now ready for dialing. Those skilled in the art are well aware that in dialing a conventional rotary dial telephone that the rotary dial will open and close from one to ten times depending on the particular digit dialed. Consequently, the basic line circuitry on the station side of the communication system will be opened and closed in accordance with this dialing. As each respective digit is dialed, relay L will release and reoperate with each dial pulse as particularly illustrated in FIG. 2. As relay L is actuated and deactuated, relay contact L1 will now switch transistor Q1 off and on at the dial pulse rate and consequently in accordance with the preceding discussion relay A will also be actuated on and off at the same dial pulse rate and will consequently translate the rotary dial pulses to lines T and R on the line side of the isolation transformer 12.

At the start of the first dial pulse of a series of dial pulses for a particular digit, transistor Q2 is switched off due to transistor Q1 being switched off because of the ground potential condition that exist at the base of transistor Q2. But at the start of a first dial pulse, it is seen that capacitor C1 is in a charged state and as described hereinbefore, transistor Q3 will be switched on due to the charge across capacitor C1 being applied to its base through resistor R5. Capacitor C1 cannot discharge through resistor R3 because of the presence of diode CR1. Capacitor C1 does in fact discharge through resistors R5 and R6 and these resistors are particularly chosen such that the discharge time of capacitor C1 will be a certain time interval as indicated by FIG. 2 and consequently transistor Q3 will conduct during this entire time interval. As is already noted, while transistor Q3 conducts, this will in effect drop the bias voltage at the base of transistor Q4 due to the current flow in resistors R7, R8 and R9, and this results in transistor Q4 being switched on such that current may be conducted therethrough. Also, while transistor Q3 causes transistor Q4 to conduct, Q3 also charges capacitor C2 through resistor R7. It follows then that Q4 causes relays B and C to be actuated and cause their respective contacts to close which effectively places a shunt across the windings of the isolation transformer 12 so as to remove the inductance of these transformer windings from the DC pulsing path in preparation for the following DC dial pulse train. If the windings of the isolation transformer were not shunted or otherwise removed from the DC pulsing path during dialing, they would severely distort the logic content of the dial pulse train and the dial pulses translated toward the telephone line by relay A and its contact A1 would then not accurately represent the pulses originated by the station telephone instrument or other signal or communication source.

As understood from this discussion and particularly FIGS. 1 and 2, relays B and C operate immediately at the start of the first dial pulse and remain operative a certain time period after each pulse due to the charge on the capacitor C2 keeping transistor Q4 in a conducting state. In the case of the preferred embodiment, this time constant for maintaining transistor Q4 operating is selected to be approximately 50 milliseconds and such is determined by the discharge path of capacitor C2 through resistors R8 and R9. It is important that the time constant be selected such that Q4 remains conducting until the next succeeding dial pulse occurs such that as noted in FIG. 2 relays B and C will remain continuously actuated during and throughout the entire dial pulse train for any given digit dialed.

Relays B and C will, therefore, release and remain inoperative during each interdigital pause which removes the shunt from the windings of the isolation transformer 12 and again allows AC signals and tones such as busy signals, etc., to pass from the telephone exchange center lines T and R to the station side lines T1 and R1. When the telephone instrument receiver is replaced to an on hook position, relays B and C will again operate momentarily and release but this operation will have no significant effect.

It is, therefore, appreciated that during the entire off-hook, pulsing and on-hook sequence, relay A will operate and release to each on/off hook condition and to each dial pulse so that relay A now accurately translates each DC logic function to the telephone lines T and R without distortion. Relays B and C will always operate together and only while the telephone is in the off hook condition. Relays B and C will simultaneously operate at the start of the first pulse of a pulse sequence and remain in an operative state as long as there are follow-on pulses within a specified time interval to assure accurate translation of the pulse timing, length and sequence, and thereby to retain all of the transmitted logic content.

On completion of an outgoing call and the station telephone instrument receiver is replaced on hook, relay L will release thereby cutting off transistor Q1 which in turn cuts off transistor Q2 and releases relay A. This opens the telephone line circuits T and R towards the central telephone exchange center. Transistors Q3 and Q4 will briefly switch on momentarily operating relays B and C but this is of no consequence as the circuit is now disconnected from the central telephone line exchange circuit. The entire circuit is then restored to the idle condition and ready for the next incoming or outgoing call.

In the case of an incoming call, from the central telephone exchange to the station telephone instrument, a ringing current of 20 Hz AC is applied to telephone lines T and R by the central office and this ringing current passes through isolation transformer 12 and passes through lines T1 and R1 so as to ring the station telephone instrument. When the station telephone is answered, the "off-hook" condition exists and this causes relay L to be actuated and as previously described this results in transistor Q1 switching on and relay A being actuated. The actuation of relay A closes the telephone line loop towards the telephone exchange through the line windings of the isolation transformer 12. This will now cut off the ringing current being applied to lines T and R and also signals to the central telephone exchange center of the presence of the answer condition. Conversation can now take place or tones can pass between the calling party or the telephone exchange and the station telephone instrument. On completion of the incoming call, the station telephone instrument assumes an on hook condition, and this causes relay L to release and restore the circuit to the idle condition which will result in relay A as described above being released.

For a telephone instrument equipped with push button tone dialing, the same functions would occur as with a conventional rotary dial telephone for on/off hook conditions as described previously. The dial pulse sequence would not be required with a push button tone dialing telephone because such tone dialing would pass directly through the isolation transformer 12 as would other voice frequency tones or conversations.

The DC signaling circuit of the present invention has been described in conjunction with a telephone communication system. It should be understood, however, that the DC signaling circuit of the present invention can be utilized in other communication systems where it is desirable to communicate pulse information and/or logic across an isolation transformer. With the basic circuitry design of the present invention, infinite variations are possible for such other applications as telemetry and data communications that use DC pulses as the information content as well as other signaling and supervisory functions. This basic circuitry can also be used in conjunction with pulse counting and register circuits and thereby apply to programmable functions in which pulse combinations could be programmed to initially control and terminate an infinite variety of actions and reactions.

In addition, it is appreciated that lines T1 and R1 could be connected to a carrier channel or multiplex voice frequency channel arranged for either tone signaling or E and M signaling. In this kind of application, signaling conversion can be accomplished by the circuit as follows.

On hook and dial pulse conditions from VF channel will appear as ground applied to terminal E which will operate relay E closing relay contact E1. This now provides the same pulse logic timing sequence described for dial pulse instruments since contact E1 now initiates the very same action as did contacts L1 described previously for dial pulsing.

For incoming calls originating from the telephone exchange, ringing current of 20 Hz AC is applied across the telephone line T and R which would pass through isolation transformer 12 and appear at the bridge rectifier including diodes CR4, CR5, CR6, and CR7 coupled through capacitor C3. This ringing current rectified by the bridge rectifier will be smoothened by capacitor C4 and applied across relay R which now operates from this rectified current. Relay contact R1B removes ground from terminal M and then contact R1A applies battery to terminal M through RT1 to signal the VF channel of the incoming call. The function of RT1 is to limit current in the event of a grounded fault on the M lead during the signaling condition.

In the case of this operation described immediately above, capacitor C3 provides AC coupling and DC blocking to the bridge rectifier comprised of diodes CR4, CR5, CR6, and CR7. Capacitor C5 and C6 in all operations provide AB coupling and DC blocking across the windings of isolation transformer 12 and they also provide for the correct termination impedance and frequency response of the station telephone instrument and the telephone exchange line connected to the isolation transformer 12. Diodes CR2 and CR3 provide protection from back EMF produced by the induction of the windings of relays A, B and C.

The present invention, of course, may be carried out in other ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In a telecommunication system including a wire pair connected to a central telephone switching exchange and leading to a station telephone located at a power substation or generating plant, and wherein a high voltage protection barrier is provided by an isolation transformer interposed between the station telephone and the telephone switching exchange for providing protection against fault conditions that could apply hazardous voltages endangering life and property to said wire pair leading from the site of the station telephone, the improvement comprising a DC signaling circuit electrically connected to the station side wire pair and responsive to the actuation of a DC detection circuit electrically connected to the station side wire pair for effectively transferring DC signals, supervisory functions, or DC pulse logic across said isolation transformer and the high voltage protection barrier created thereby to the wire pair leading from the isolation transformer to the telephone switching exchange, said DC signaling circuit comprising: first relay means and first relay contact means operatively associated with said wire pair on a line side of said isolation transformer that leads to said telephone switching exchange, said first relay means being responsive to a given DC signal in said DC signaling circuit for actuating said first relay contact means which causes a DC signal corresponding to said given DC signal to be communicated by said wire pair on said line side of said isolation transformer to said telephone switching exchange; second relay means and said second relay contact means operatively connected in said DC signaling circuit with said second relay contact means being operatively connected on each side of said isolation transformer and effective upon actuation to completely shunt all windings of said isolation transformer, and wherein said second relay means is responsive to certain DC pulse signals generated by said station telephone for actuating said second relay contact means and consequently causing all windings of said isolation transformer to be shunted so as to effectively remove the inductance from the station and line side wire pairs and thereby generally prevent distortion of the logic content of any DC signal or signals being communicated by said wire pair; and means operatively associated with said second relay means for maintaining said second relay means in an operative actuating state for a time interval after each pulse generated by said station telephone; and a power source operatively connected to said DC signaling circuit for supplying the same with current to actuate said first and second relay means, and other components thereof.

2. The DC signaling circuit for the telecommunication system of claim 1 wherein said means for maintaining said second relay means in an operative actuating state includes: transistor means for supplying current to said second relay means; and capacitor means operatively connected to said transistor means and which assumes a charged state during time intervals when DC pulse signals are actually generated by said station telephone, said capacitor means operative to discharge and actuate said transistor means after each DC pulse signal generated by said station telephone has ceased to exist thereby causing said second relay means and said second relay contact means to be continuously actuated and to shunt the windings of said isolation transformer for the occurrence of each DC pulse signal.

3. The DC signaling circuit for the telecommunication system of claim 1 wherein said DC signaling circuit includes a circuit actuating third relay means responsive to any DC signal generated by said station telephone and wherein said third relay is operative to actuate a corresponding third relay contact which in turn is operative to cause a first transistor to conduct and direct current to said first relay which consequently actuates said first relay contact means in the side of said wire pair.

4. A DC signaling circuit for effectively communicating DC signals such as an "off-hook" condition and dial pulses across an isolation transformer operatively connected between a cable pair leading to one station telephone located at a station site of potential high voltage such as a power substation or generating plant and a telephone switching exchange, wherein said isolation transformer provides protection from ground potential rise and other hazardous voltage conditions that may accidentally or inadvertently be transferred to a telephone cable pair leaving said station, said DC signaling circuit comprising: a power source operative to supply power to said DC signaling circuit; circuit actuating means electrically connected in said DC signaling circuit and responsive to the actuation of a DC detection circuit electrically connected to the station telephone; first relay means and associated first relay contact means electrically connected on a line side of said isolation transformer and responsive to said circuit actuating means for effectively closing the cable pair leading from the isolation transformer to the telephone switching exchange and to signal to said telephone switching exchange an "off-hook" mode such that an AC dial tone signal may be communicated back to said station telephone; said first relay means being further responsive to DC dial pulses generated by said station telephone for actuating said first relay contact means for closing the line side of said telephone cable pair so as to effectively communicate DC dial pulse signals to said telephone switching exchange that correspond to the DC dial pulse signals generated by said station telephone; second relay means and associated second relay contact means electrically connected in said DC signaling circuit wherein said second relay contact means is operatively connected on each side of said isolation transformer and wherein said second relay means and said second relay contact means are operatively responsive to dial pulses generated by said station telephone for actuating said second relay contact means and completely shunting the windings of both sides of said isolation transformer while said DC pulse signals are effectively communicated to said central telephone exchange so as to generally remove the inductance from both sides of the isolation transformer windings and the associated distortion in said telephone cable pair; and means connected in said DC signaling circuit for actuating said second relay means for a selected time interval after the occurrence of respective dial pulses such that said second relay contact means continuously shunts the windings of said isolation transformer for the duration of one or more dial pulses making up a selected dial digit.

5. The DC signaling circuit of claim 4 wherein said means for actuating said second relay means for a selected time interval after each dial pulse includes a first capacitor normally charged prior to the occurrence of a dial pulse and responsive to the occurrence of a station telephone dial pulse to actuate a first transistor which is operative to actuate a second transistor operatively connected to said second relay means for directing current thereto and actuating said second relay means, and wherein said first transistor is operative during the occurrence of respective dial pulses to charge a second capacitor which in turn is operative to discharge after the occurrence of respective dial pulses and wherein said second capacitor is operative during discharge to actuate said second transistor for a selected time interval after the occurrence of each respective dial pulse such that said second relay means and said second relay contact means are actuated during said selected time intervals after each DC dial pulse such that the windings of said isolation transformer are shunted during a series of successive dial pulses making up a respective dialed digit.

6. The DC signaling circuit of claim 5 wherein said second capacitor is operative to discharge across at least one resistor to actuate said second transistor with the discharge time constant of said second capacitor being at least fifty milliseconds thereby assuring that said second relay means is actuated at least fifty milliseconds after the occurrence of each dial pulse.

7. A DC signaling circuit for communicating DC signals across an isolation transformer and which is adapted to sense DC signals generated by a telephone on one side, referred to as a station side, of said isolation transformer and to cause corresponding like DC signals to be transferred to or simulated on the other side of said isolation transformer referred to as a line side, said DC signaling circuit comprising: a power source operatively connected in said DC signaling circuit for supplying power to said DC signaling circuit and to said telephone; circuit actuating means electrically connected in said DC signaling circuit and responsive to the actuation of a DC detection circuit electrically connected to said telephone for actuating said DC signaling circuit; first relay means and first relay contact means operatively associated with said DC signaling circuit and responsive to said circuit actuating means for actuating a first transistor in said DC signaling circuit; said first transistor once actuated being operative to conduct current to a second relay means operatively connected in said DC signaling circuit and which is accordingly responsive to said circuit actuating means and the generation of a DC signal by said telephone; said second relay means operative to actuate second relay contact means connected on the line side of said isolation transformer opposite said signaling source wherein the actuation of said second relay contact means is effective to duplicate respective DC signals generated by said telephone such that the DC signals generated by said telephone are effectively transferred to the line side of said isolation transformer despite the presence of said isolation transformer; a second transistor operatively connected in said DC signaling circuit and actuated by said first transistor for charging a first capacitor connected in said DC signaling circuit; said first capacitor operative to discharge in response to a selected DC signal such as a dial pulse and in discharging is operative to actuate a third transistor operatively connected in said DC signaling circuit; said third transistor operatively connected to a fourth transistor in said DC signaling circuit and adapted to actuate said fourth transistor when said third transistor is actuated and conducting current therethrough; said fourth transistor operatively connected to third relay means operatively connected in said DC signaling circuit and wherein said third relay means is operative to actuate third relay contact means operatively associated with the windings of said isolation transformer for completely shunting the windings thereof while respective DC pulses are being communicated on the line side of said isolation transformer; and wherein said third transistor is operatively connected to a second capacitor in said DC signaling circuit for charging said second capacitor during the time interval that said third transistor is actuated and conducting; said second capacitor being operatively associated with said fourth transistor for discharging and actuating said fourth transistor for a selected time interval after said third transistor is no longer actuated and conducting whereby the discharging of said second capacitor results in the windings of said isolation transformer being shunted for a selected time period after the occurrence of said certain DC signal such that in the case of DC dial pulses the windings of said isolation transformer are effectively shunted for the entire duration of a series of successive dial pulses that make up a dialed digit.

8. The DC signaling circuit of claim 7 wherein a diode is operatively connected between said first capacitor and said second transistor for preventing the discharge of said first capacitor from actuating said second transistor.

9. The DC signaling circuit of claim 7 wherein resistor means are operatively associated in said DC signaling circuit with both said first and second capacitors for determining the time interval of discharge of each of the capacitors.

10. The DC signaling circuit of claim 7 wherein said signaling source includes a carrier/multiplex channel.

11. The DC signaling circuit of claim 7 wherein said signaling source includes a tone signaling instrument.

12. The DC signaling circuit of claim 7 wherein said signaling source includes a telephone operatively connected to said isolation transformer about the station site of said isolation transformer opposite said line side, and wherein said line side of said isolation transformer leads to a central telephone exchange and wherein said station site is located about a situs of potential high voltage such as a power substation or generating plant whereby said isolation transformer provides a high voltage protection barrier between said telephone and said line side.

* * * * *